(12) United States Patent
Shimizu et al.

(10) Patent No.: US 8,074,776 B2
(45) Date of Patent: Dec. 13, 2011

(54) ALL-TERRAIN VEHICLE

(75) Inventors: Katsuhisa Shimizu, Shizuoka (JP); Takeshi Kinugasa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1182 days.

(21) Appl. No.: 11/466,804

(22) Filed: Aug. 24, 2006

(65) Prior Publication Data

US 2007/0284856 A1 Dec. 13, 2007

Related U.S. Application Data

(60) Provisional application No. 60/804,359, filed on Jun. 9, 2006.

(51) Int. Cl.
*F16D 55/00* (2006.01)

(52) U.S. Cl. ....... 188/71.1; 305/107; 305/110; 404/121; 280/855; 280/856

(58) Field of Classification Search .................. 305/107, 305/110; 404/121; 280/855, 856
See application file for complete search history.

(56) References Cited

U.S. PATENT DOCUMENTS

| 2,077,919 | A | * | 4/1937 | Engstrom | 280/856 |
|---|---|---|---|---|---|
| 3,473,631 | A | * | 10/1969 | Schmid | 188/71.1 |
| 3,850,267 | A | * | 11/1974 | Odier | 188/71.6 |
| 4,473,139 | A | * | 9/1984 | Oka et al. | 188/71.6 |
| 5,330,260 | A | * | 7/1994 | Freeman | 305/110 |
| 5,820,230 | A | * | 10/1998 | Freeman | 305/107 |
| 6,019,443 | A | * | 2/2000 | Freeman | 305/110 |
| 6,257,378 | B1 | * | 7/2001 | Girkin et al. | 188/73.31 |
| 6,776,698 | B2 | * | 8/2004 | Pepin et al. | 451/434 |
| 6,851,691 | B2 | * | 2/2005 | Rasidescu et al. | 280/124.135 |
| 2002/0153763 | A1 | * | 10/2002 | Van Houten et al. | 301/37.43 |

FOREIGN PATENT DOCUMENTS

| JP | 05179613 A | * | 7/1993 |
| JP | 2006-071042 A | | 3/2006 |

* cited by examiner

*Primary Examiner* — Robert Siconolfi
*Assistant Examiner* — James Hsiao
(74) *Attorney, Agent, or Firm* — Keating & Bennett, LLP

(57) ABSTRACT

An all-terrain straddle type vehicle includes, inside a wheel, a disc rotor that rotates as the wheel rotates, a caliper for clamping the disc rotor to brake the rotation of the wheel, and a scraper for scraping out dirt, mud, sand, snow and other debris deposited on a rim of the wheel. An edge of a scraping surface of the scraper extends obliquely from upstream toward downstream of a rotation direction of the wheel with respect to a rotation plane of the wheel.

13 Claims, 10 Drawing Sheets

ALL-TERRAIN VEHICLE

BACKGROUND OF THE INVENTION

1. Field of the Invention

The present invention relates to an all-terrain straddle type vehicle, and more specifically to an all-terrain straddle type vehicle having a disc brake provided within a wheel.

2. Description of the Related Art

Conventional straddle type vehicles involve a problem in that when a vehicle runs on rough terrain, mud or the like adheres onto the vehicle wheels, and the mud or the like clogs and solidifies within the wheel of each vehicle wheel. In the case of a straddle type vehicle having a disc brake provided within the wheel, in particular, mud or the like can easily clog the gap between a brake caliper and the wheel. If the running of the vehicle is continued while leaving the mud or the like clogged in the gap as it is, the clogged mud or the like is gradually compressed by the brake caliper. The mud or the like compressed in the gap between the brake caliper and the wheel is difficult to remove manually. Further, if, as a result of interference with the brake caliper, the compressed mud is scattered and thrown in the form of dust and enters the gap between a disc rotor and a brake pad, this accelerates wear of the brake pad, causing a reduction in the life of the brake pad.

Accordingly, it is necessary to quickly remove mud or the like deposited inside the wheel. A device for removing mud or the like deposited inside the wheel is disclosed in, for example, JP-A-2006-71042 (Patent Document 1).

Patent Document 1 discloses a brake caliper supporting structure in which the brake caliper includes a pair of brake pads for clamping a brake disc, a piston for pressing the brake pads, a caliper body accommodating the piston in a movable manner, and a caliper bracket mounted to a caliper supporting portion which is connected to a knuckle to support the caliper body in a movable manner, and in which the distance from the center of the vehicle wheel to the caliper supporting portion is larger than the distance between the center of the vehicle wheel to the piston. Since the caliper supporting portion is located radially outside, mud, snow, or the like adhering onto the inner side of the wheel can be scraped off by the caliper supporting portion.

However, in the case of the brake caliper disclosed in Patent Document 1, since the mud, snow, or the like inside the wheel is scraped off in the vertically downward direction by the caliper supporting portion, the majority of the mud, snow, or the like thus scraped off keeps accumulating inside the wheel. In this regard, in the case of a straddle type vehicle that runs on rough terrain, in particular, in order to improve the riding comfort by absorbing vibrations resulting from the unevenness of the road surface, it is required to provide a large suspension stroke by setting a high minimum ground clearance for the vehicle. Since an increase in suspension stroke results in a corresponding increase in the depth of the wheel, this makes mud, snow, or the like even more likely to accumulate inside the wheel. If the mud, snow, or the like that has once been scraped off is allowed to keep accumulating inside the wheel thereafter, the amount of mud, snow, or the like deposited inside the wheel increases as the running time of the vehicle becomes longer. Eventually, the removal of the old mud, snow, or the like can no longer keep pace with the rate of depositing new mud, snow, or the like, thereby resulting in clogging.

SUMMARY OF THE INVENTION

In order to overcome the problems described above, preferred embodiments of the present invention provide an all-terrain straddle type vehicle capable of efficiently removing dirt, mud, sand, snow and other debris deposited inside the wheel.

An all-terrain straddle type vehicle according to a first preferred embodiment of the present invention includes a wheel, and a disc brake arranged within the wheel. The disc brake includes a disc rotor that rotates in accordance with rotation of the wheel, and a caliper for clamping the disc rotor to brake the rotation of the wheel. A scraper for scraping out dirt, mud, sand, snow and other debris deposited on a rim of the wheel is arranged within the wheel, and an edge of a scraping surface of the scraper extends obliquely from upstream toward downstream of a rotation direction of the wheel with respect to a rotation plane of the wheel.

In a preferred embodiment, the edge extends obliquely from the outside toward the inside of the vehicle.

In another preferred embodiment, the scraper and the caliper are integral.

In another preferred embodiment, a gap between the edge and the rim is smaller than a gap between the caliper and the rim.

In another preferred embodiment, the caliper is arranged on a downstream side of the rotation direction of the wheel with respect to a lowermost point of the wheel, and the scraper is arranged on an upstream side of the rotation direction with respect to the caliper and on a downstream side of the rotation direction with respect to the lowermost point.

In another preferred embodiment, the scraping surface of the scraper is directed toward a vertically lower side.

In another preferred embodiment, the scraper and the caliper are separate components, and are arranged at positions substantially opposed to each other with a rotation axis of the wheel therebetween.

In another preferred embodiment, the caliper includes a caliper body portion for clamping the disc rotor, and a caliper supporting portion for fixing the caliper body portion within the wheel, and a transverse length of the caliper body portion is smaller than a transverse length of the edge.

In another preferred embodiment, the wheel is a rear wheel, and the caliper provided within the wheel of the rear wheel is arranged in front of an axle of the rear wheel.

In another preferred embodiment, the wheel is a rear wheel, and the caliper provided within the wheel of the rear wheel is arranged on a downstream side of the rotation direction with respect to a lowermost point of the wheel and on an upstream side of the rotation direction with respect to a lowermost point of the wheel.

In another preferred embodiment, a scraper supporting member for fixing the scraper within the wheel is made of a flexible material.

In another preferred embodiment, the scraper supporting member is a ring wheel for protecting the disc rotor, and the ring wheel is made of a resin or plastic material.

An all-terrain straddle type vehicle according to another preferred embodiment of the present invention includes a wheel, and a disc brake arranged within the wheel. The disc brake includes a disc rotor that rotates in accordance with rotation of the wheel, and a caliper for clamping the disc rotor to brake the rotation of the wheel. A scraper for scraping out dirt, mud, sand, snow and other debris deposited on a rim of the wheel is arranged within the wheel, and a scraping surface of the scraper is arranged so as to scrape out the dirt, mud, sand, snow and other debris deposited on the rim toward inside of the vehicle.

An all-terrain straddle type vehicle according to the present preferred embodiment relates to an all-terrain straddle type vehicle having an independent type suspension, including a wheel of a rear wheel, and a disc brake arranged within the wheel. The disc brake includes a disc rotor that rotates in accordance with rotation of the wheel, and a caliper for clamping the disc rotor to brake the rotation of the wheel. The caliper is arranged in front of an axle of the rear wheel.

In another preferred embodiment, the all-terrain straddle type vehicle further includes an engine, and a drive shaft for transmitting a driving force from the engine to the rear wheel.

In another preferred embodiment, the independent type suspension is of a double wishbone type.

In the all-terrain straddle type vehicle according to the present preferred embodiment, the disc rotor that rotates in accordance with the rotation of the wheel, the caliper for clamping the disc rotor to brake the rotation of the wheel, and the scraper for scraping out dirt, mud, sand, snow and other debris deposited on the rim of the wheel are arranged within the wheel. Since the edge of the scraping surface of the scraper extends obliquely from upstream toward downstream of the rotation direction of the wheel with respect to the rotation plane of the wheel, as the wheel rotates, the dirt, mud, sand, snow and other debris deposited on the rim of the wheel are scraped out in the direction toward the inside (or the outside) of the vehicle, that is, in the direction toward the side where the caliper is not arranged. Accordingly, it is possible to prevent the dirt, mud, sand, snow and other debris deposited on the rim from abutting the caliper, and hence to prevent the dirt, mud, sand, snow and other debris from clogging the gap between the caliper and the rim and being compressed therein. As a result, it is possible to minimize the acceleration of wear of the brake pads inside the caliper to thereby achieve an increase in the life of the brake pads.

In addition, the dirt, mud, sand, snow and other debris thus scraped out can be reliably discharged to the outside of the wheel as they are allowed to be thrown toward the inside (or the outside) of the vehicle, thus making it possible to increase the efficiency of removal of the dirt, mud, sand, snow and other debris deposited inside the wheel.

According to the preferred embodiments of the present invention, it is possible to provide an all-terrain straddle type vehicle capable of efficiently removing dirt, mud, sand, snow and other debris deposited inside the wheel.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described with reference to the drawings. For the simplicity of description, the disclosed features have substantially the same function throughout the following drawings. It should be noted that the present invention is not limited to the preferred embodiments described below.

Figure 1:
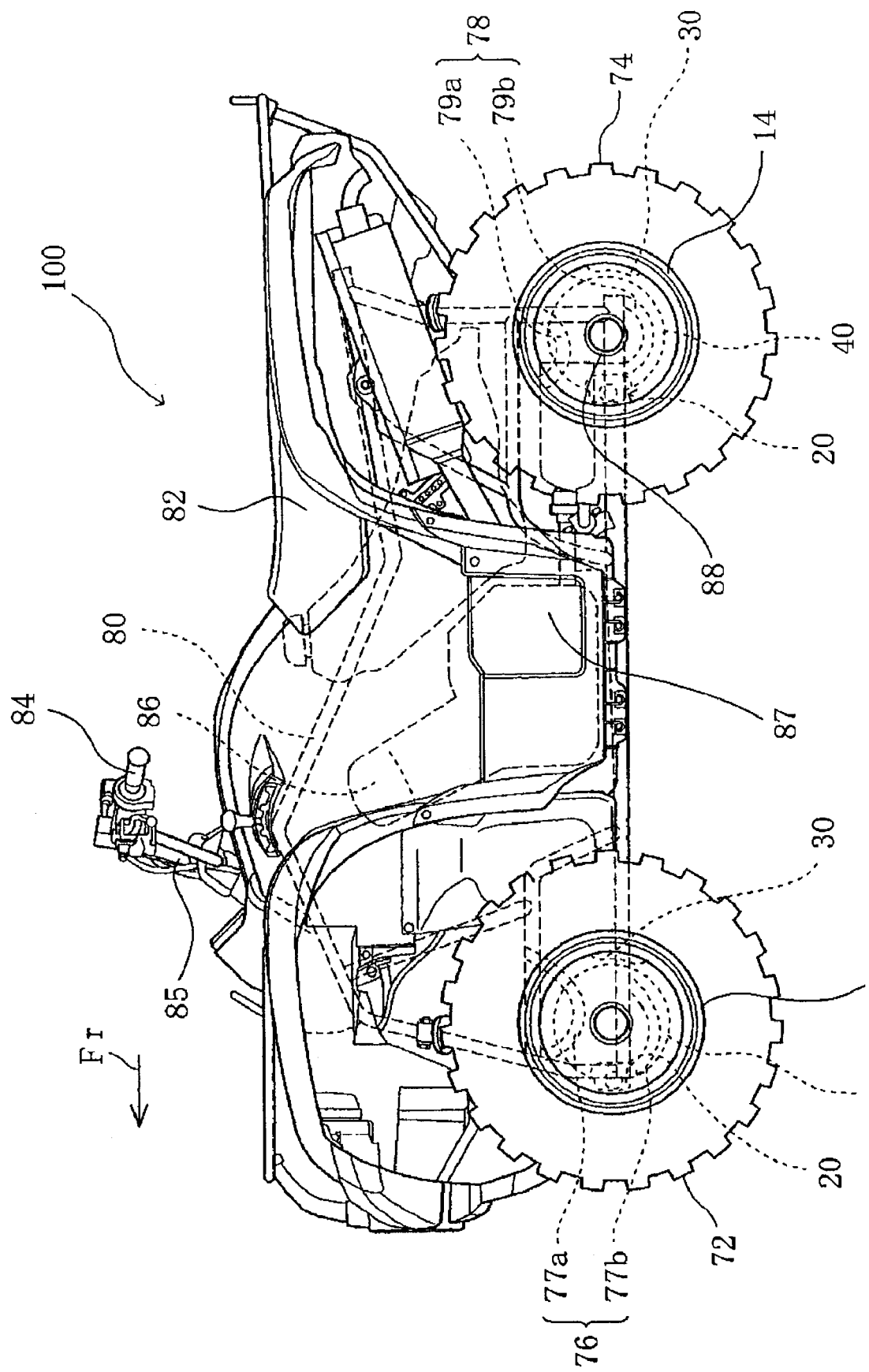
FIG. 1 is an exterior side view schematically showing an all-terrain straddle type vehicle according to a first preferred embodiment of the present invention.

Referring to FIG. 1, an all-terrain straddle type vehicle 100 according to the first preferred embodiment of the present invention will be described. FIG. 1 is an exterior side view schematically showing the all-terrain straddle type vehicle 100.

The all-terrain straddle type vehicle 100 includes a vehicle body frame 80, a seat 82, handlebars 84, an engine 86, a left front wheel 72, and a left rear wheel 74.

The seat 82 on which the rider sits is arranged on the rear end in the longitudinal direction of the vehicle, and the handlebars 84 are disposed in front of the seat 82. A steering shaft 85 extends downwardly and forwardly from the handlebars 84. The steering shaft 85 supports the left and right front wheels 72 (only the left-side front wheel 72 is shown in FIG. 1) mounted to the front portion of the vehicle.

The rider sitting on the seat 82 controls the handlebars 84, and the control force is transmitted to the front wheels 72 through the steering shaft 85. The advancing direction Fr of the all-terrain straddle type vehicle 100 is determined by changing the direction of the front wheels 72.

On the other hand, the engine 86 is mounted in front of and below the seat 82, and the left and right rear wheels 74 (only the left-side rear wheel 74 is shown in FIG. 1) are mounted to the rear of the engine 86. A transmission 87 and a drive shaft 88 are interposed between the engine 86 and the rear wheels 74. The drive force generated by the engine 86 is transmitted to the rear wheels 74 via the transmission 87 and the drive shaft 88 to drive the rear wheels 74.

It should be noted that the all-terrain straddle type vehicle 100 according to the present preferred embodiment is preferably a four-wheel drive vehicle whose front wheels 72 and rear wheels 74 can be driven, and the power of the engine 86 is also transmitted to the front wheels 72 to drive the front wheels 72.

The front wheels 72 and the rear wheels 74 are mounted to the vehicle body frame 80 by a front suspension 76 and a rear suspension 78, respectively, so as to be vertically movable. The front suspension 76 and the rear suspension 78 according to the present preferred embodiment are each an independent type suspension in which the left and right wheels are operated independently, and preferably use a double wishbone system in which a pair of upper and lower suspension members (arms) 77a, 77b are coupled to a wheel 12 of the front wheels 72 and a pair of upper and lower suspension members (arms) 79a, 79b are coupled to a wheel 14 of the rear wheels 74 to thereby support the front wheels 72 and the rear wheels 74.

Braking devices for stopping the front wheels 72 and the rear wheels 74 driven by the engine 86 are provided inside each of the wheels 12 and 14 supported by the upper and lower suspension members. The braking device of the all-terrain straddle type vehicle 100 is preferably a hydraulic disc brake 50. The disc brake 50 includes a disc rotor 40 that rotates as the wheels 12 and 14 rotate, and a caliper 20 that clamps the disc rotor 40 to brake the rotation of the wheels 12 and 14.

Further, in each of the wheels 12 and 14, a scraper 30 is arranged at a position opposed to the caliper 20. Dirt, mud, sand, snow and other debris that have been deposited inside each of the wheels 12 and 14 are scraped out by the scraper 30.

Figure 2:
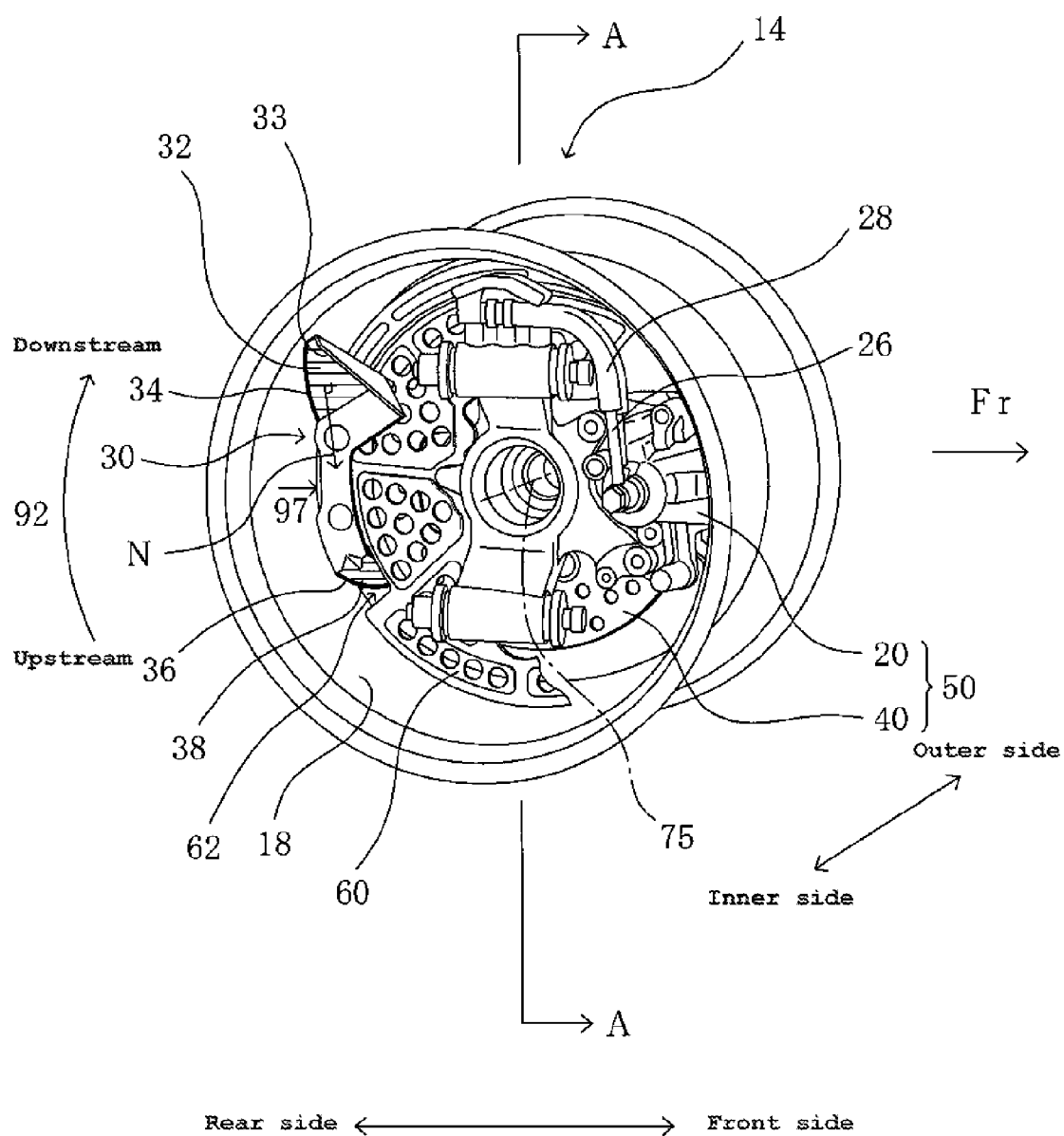
FIG. 2 is an exterior perspective view, as seen from the inside of the vehicle, of the interior of the left-side rear wheel.

Next, referring to FIG. 2, the internal structure of the wheels 12 and 14 according to the present preferred embodiment will be described. FIG. 2 is an exterior perspective view, as seen from the inside of the vehicle, of the interior of the wheel 14 of the left-side rear wheel 74. For easier illustration of the internal structure of the wheel 14, a portion of a ring wheel 60 is omitted in the drawing.

The disc brake 50 for braking the rear wheel 74 driven by the engine 86 is provided in the interior of the wheel 14. The disc brake 50 includes the disc rotor 40 and the caliper 20.

The disc rotor 40 is a disc-like member made of metal that is arranged inside a rim 18 of the wheel. A plurality of holes are provided in the disc rotor 40 for the purpose of weight reduction and heat radiation. The disc rotor 40 is mounted to a hub (not shown in FIG. 2) of the wheel 14. As the wheel 14 rotates in the direction of an arrow 92, the disc rotor 40 also rotates in the direction of the arrow 92.

The caliper 20 is arranged on the front side within the wheel 14. The caliper 20 is located in front of the disc rotor 40 with a constant gap maintained between the caliper 20 and the disc rotor 40, and arranged so as to clamp the front end portion of the disc rotor 40. When bringing the vehicle 100 to a stop, the caliper 20 clamps the disc rotor 40 rotating in the direction of the arrow 92, thereby braking the rotation of the wheel 14.

Further, the scraper 30 for scraping away dirt, mud, sand, snow and other debris deposited on the rim 18 of the wheel 14 is arranged within the wheel 14. The scraper 30 according to the present preferred embodiment is arranged on the rear side within the wheel 14, and is provided at a position opposed to the caliper 20 with a rotation axis 75 of the wheel 14 therebetween.

The scraper 30 has a scraping surface 32 directed toward the upstream side in the rotation direction 92 of the wheel 14. As the wheel 14 rotates, the dirt, mud, sand, snow and other debris deposited on the rim 18 are carried to the position of the scraper 30, and then scraped off by the scraping surface 32.

Figure 3:
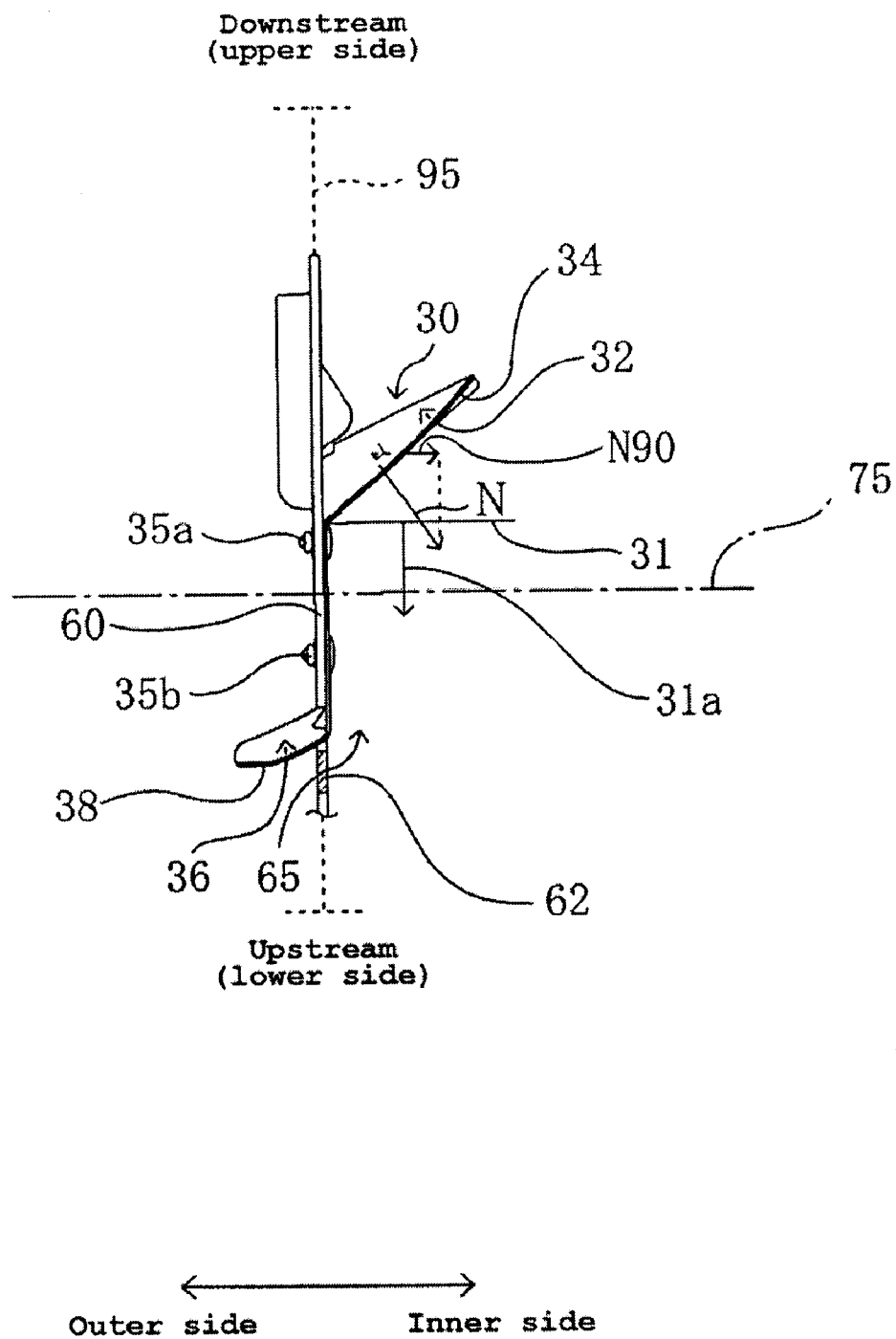
FIG. 3 is an enlarged view showing a portion of the scraper shown in FIG. 2, as seen from the rear side of the vehicle.

Now, referring to FIG. 3 in addition to FIG. 2, the planar direction of the scraping surface 32 of the scraper 30 will be described. FIG. 3 is an enlarged view showing a portion of the scraper 30 shown in FIG. 2, as seen from the rear side of the vehicle (arrow 97).

The scraping surface 32 of the scraper 30 is a surface directed toward the upstream side in the rotation direction 92 of the wheel 14. In the example shown in FIG. 3, the scraping surface 32 is inclined toward the back of the plane of the drawing. An edge 34 of the scraping surface 32 on the rim 18 side extends obliquely from the upstream to the downstream of the rotation direction 92 of the wheel 14 with respect to a rotation plane 95 of the wheel 14 (plane perpendicular to the rotation axis 75 of the wheel 14). That is, the edge 34 extends not in parallel (see line segment 31) to the rotation axis 75 of the wheel 14 but obliquely from the upstream side to the downstream side of the rotation direction. In other words, the edge 34 extends obliquely so as to deflect in the direction of the rotation axis 75 of the wheel 14.

Since the edge 34 extends obliquely, the planar direction of the scraping surface 32 is not vertically downward (arrow 31a) but is inclined so as to be directed toward the inside (or the outside) of the vehicle. In other words, the normal vector N of the scraping surface 32 has at least a component N90 directed toward the inside (or the outside) of the vehicle.

Since the normal vector N of the scraping surface 32 has at least the component N90 directed toward the inside (or the outside) of the vehicle, the dirt, mud, sand, snow and other debris scraped out by the scraping surface 32 is thrown toward at least the inside (or the outside) of the vehicle.

According to the all-terrain straddle type vehicle 100 of the present preferred embodiment, the edge 34 of the scraping surface 32 extends obliquely from the upstream to the downstream of the rotation direction 92 of the wheel 14 with respect to the rotation plane 95 of the wheel 14, whereby the dirt, mud, sand, snow and other debris on the rim 18 scraped out by the edge 34 are scraped out in the direction toward the inside (or the outside) of the vehicle, that is, toward the side where the caliper 20 is not arranged. It is thus possible to prevent the dirt, mud, sand, snow and other debris deposited on the rim 18 from contacting the caliper 20 inside the wheel. As a result, it is possible to avoid a situation where the dirt, mud, sand, snow and other debris clog the gap between the caliper 20 and the rim 18 and are compressed therein. As a result, it is possible to minimize the wear of the brake pads inside the caliper to thereby achieve an increase in the life of the brake pads.

Moreover, since the dirt, mud, sand, snow and other debris thus scraped out is thrown toward the inside (or the outside) of the vehicle, dirt, mud, sand, snow and other debris do not accumulate inside the wheel 14 but are reliably discharged to the outside of the wheel 14, thereby making it possible to enhance the efficiency of removing the dirt, mud, sand, snow and other debris deposited inside the wheel 14.

In the example shown in FIG. 2, the scraper 30 and the caliper 20 are preferably separate components and arranged at positions opposed to each other with the rotation axis 75 of the wheel 14 therebetween. However, as long as the edge 34 of the scraping surface 32 extends obliquely with respect to the rotation plane 95 of the wheel 14, the deposited dirt, mud, sand, snow and other debris are scraped to the outside of the wheel 14 and do not contact the caliper 20. Therefore, the scraper 30 and the caliper 20 may be arranged adjacent to each other, or the scraper 30 and the caliper 20 may be integral with each other.

Figure 4A:
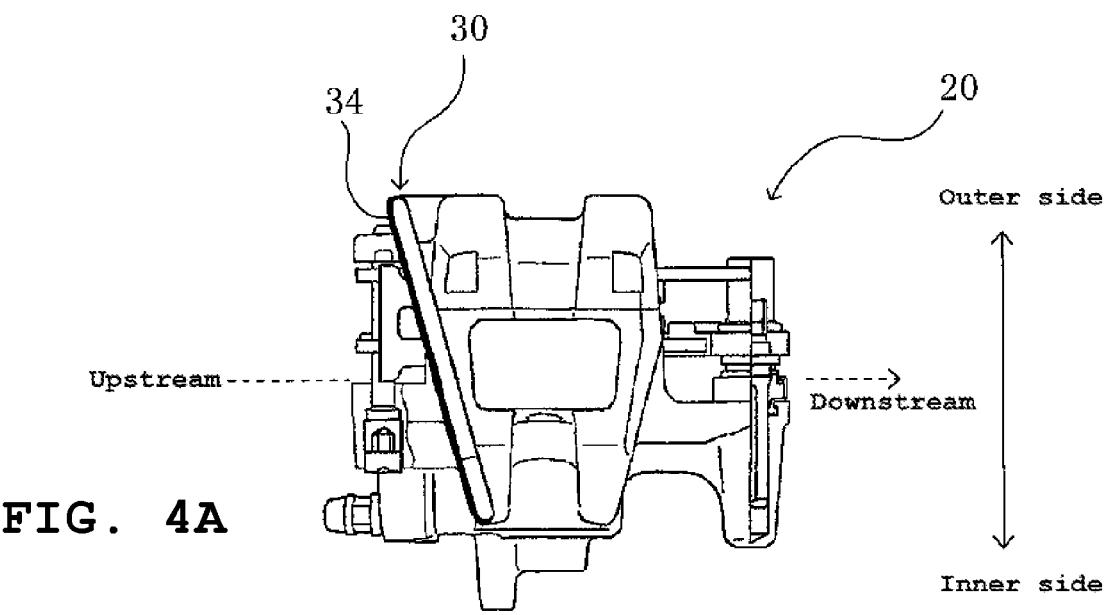
FIGS. 4A and 4B are, respectively, a top view and a front view of an integral caliper and scraper.
Figure 4B:
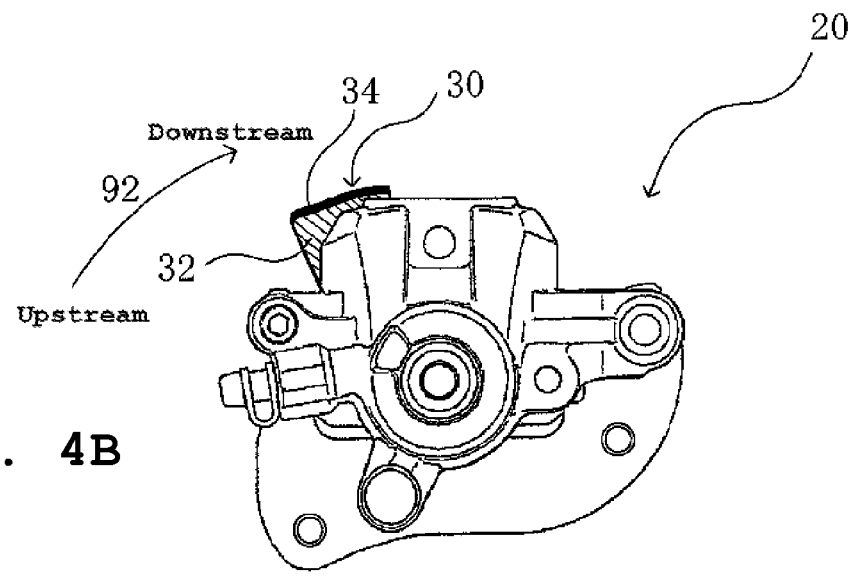

For example, FIG. 4 shows a caliper 20 having the scraper 30 integral with the caliper. Also in the case of the construction where the scraper and the caliper are integral in this way, the deposited dirt, mud, sand, snow and other debris are scraped out in the direction toward the inside of the vehicle (in the example shown in the drawing) and thus do not clog the gap between the caliper 20 and the rim 18, thereby making it possible to attain the effect of minimizing the acceleration of wear of the brake pads inside the caliper 20.

Further, the present preferred embodiment is unique in that the edge 34 of the scraping surface 32 extends obliquely with respect to the rotation plane 95 of the wheel 14. However, the present invention is not limited to the construction in which the edge 34 extends obliquely, as long as the deposited dirt, mud, sand, snow and other debris are scraped out toward the inside (or the outside) of the vehicle by the scraping surface 32, that is, as long as the scraping surface 32 is arranged so as to scrape out the dirt, mud, sand, snow and other debris toward the inside (or the outside) of the vehicle. For example, a construction may also be used in which only the edge 34 extends substantially perpendicularly and the surface portion other than the edge 34 is inclined.

Figure 5:
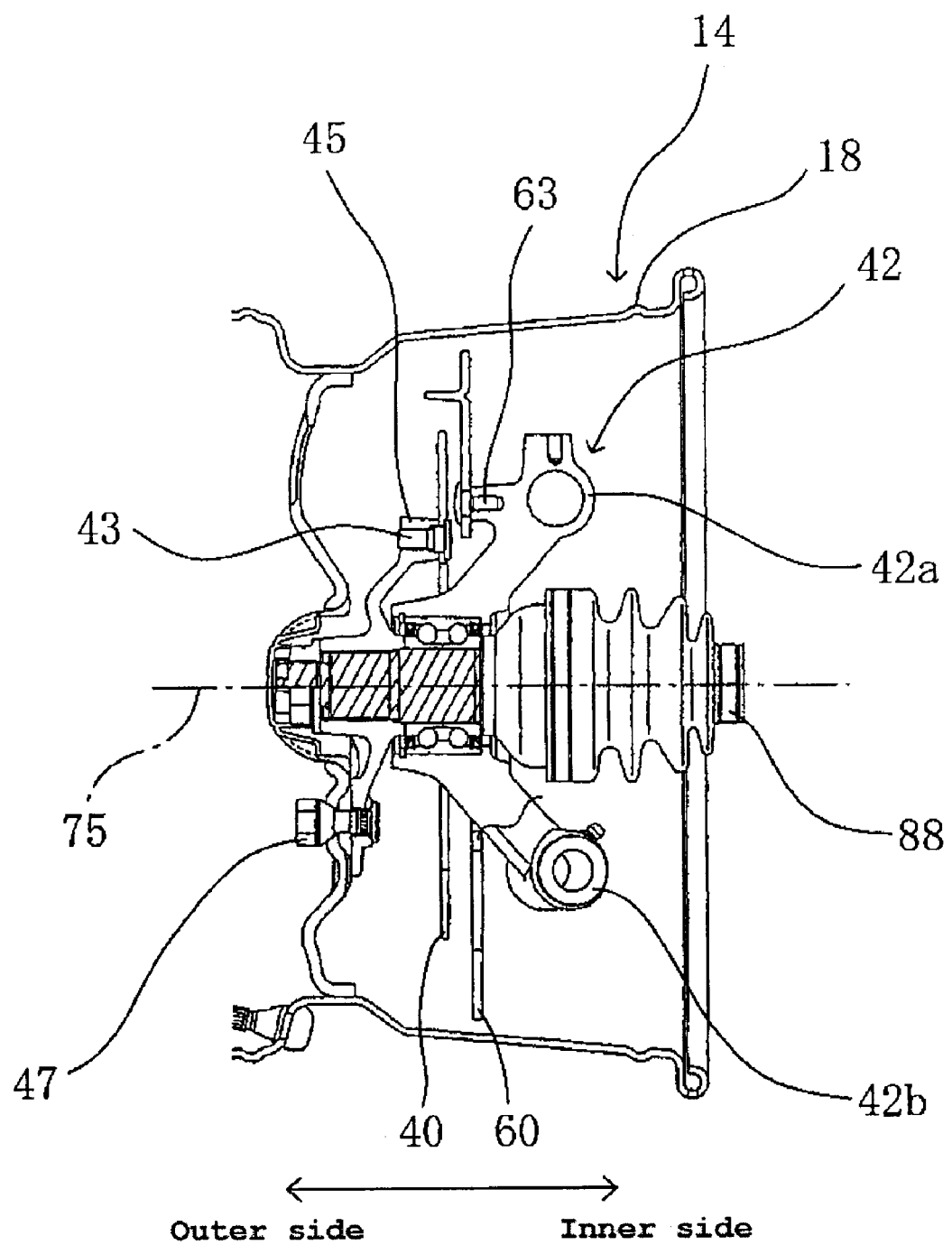
FIG. 5 is a schematic sectional view showing the section taken along the line A-A of FIG. 2.

Next, referring to FIG. 5 in addition to FIG. 2, the internal structure of the wheel 14 will be described in detail. FIG. 5 is a schematic sectional view showing the section taken along the line A-A of FIG. 2.

As described above, the all-terrain straddle type vehicle 100 according to the present preferred embodiment preferably uses a double wishbone type suspension, and first ends of the upper arm 79*a* and lower arm 79*b* (not shown in FIG. 5), which are mounted to the vehicle body frame 80 so as to be vertically movable, are connected to the ends 42*a*, 42*b* of the knuckle bracket 42 inside the wheel 14, respectively. A hub 45 is rotatably mounted to the knuckle bracket 42 via a bearing. The drive shaft 88 for transmitting the driving force of the engine 86 is spline-coupled to the inside of the hub 45.

The wheel 14 and the disc rotor 40 are mounted to the hub 45 by a wheel nut 47 and a plurality of bolts 43. The disc rotor 40 and the wheel 14 are adapted to rotate as the hub 45 rotates.

The ring wheel 60 having a disc-like shape is provided on the vehicle inner side of the disc rotor 40. The ring wheel 60 is mounted to the knuckle bracket 42 with a bolt 63 and serves to guard the disc rotor 40 from small stones or the like thrown up by the wheels.

Figure 6:
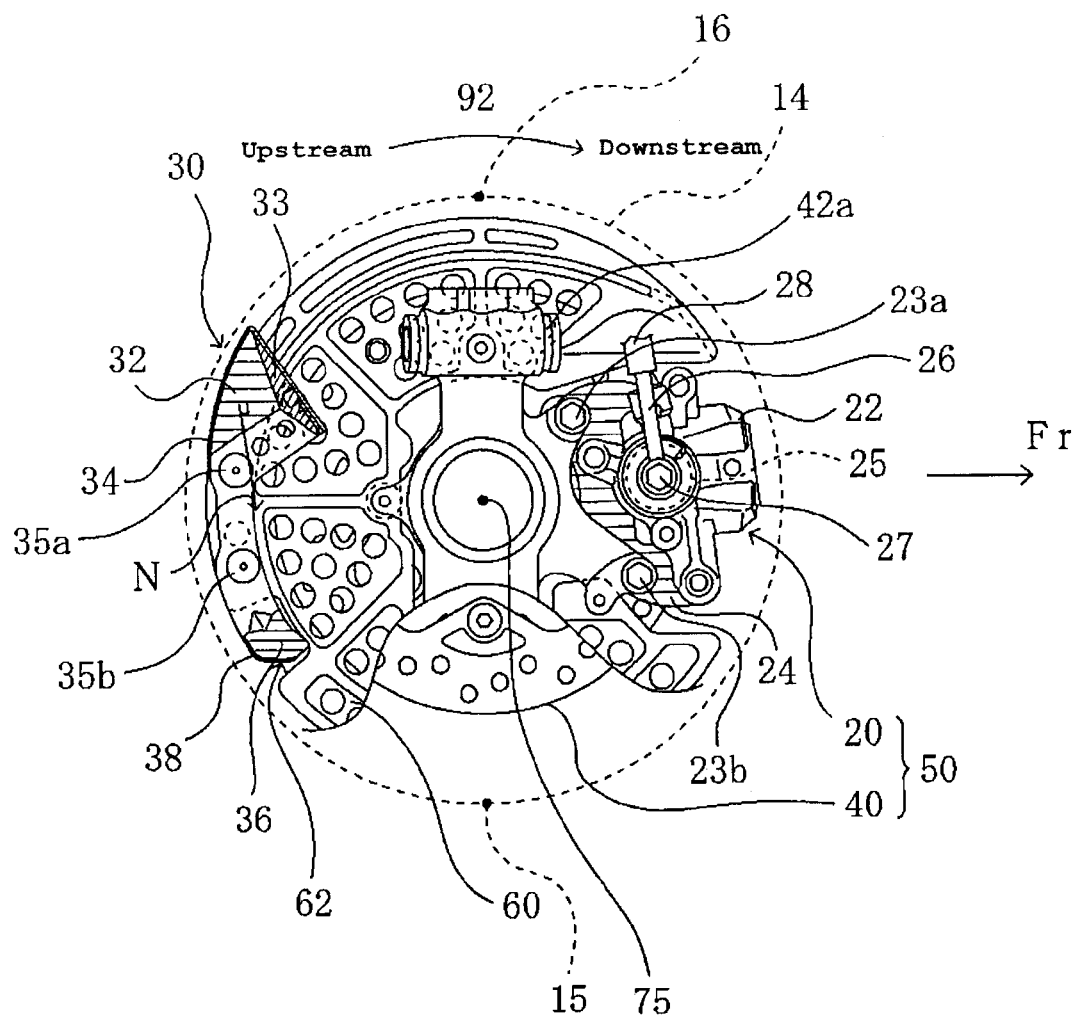
FIG. 6 is a schematic exterior view, as seen from the inside of the vehicle, of the interior of the left-side rear wheel.

Next, referring to FIG. 6, the structure of the scraper 30 and caliper 20 that are arranged inside the wheel 14 will be described. FIG. 6 is a schematic exterior view of the interior of the wheel of the left-side rear wheel 74, as seen from the inside of the vehicle. The lower sides of the wheel 14, rim 18, and ring wheel 60 are partially omitted in the drawing.

The caliper 20 according to the present preferred embodiment is arranged so as to be located in front of the axis 75 of the rear wheel 74 (the rotation axis of the wheel 14). Specifically, a cutout is provided on the front side of the ring wheel 60, and the caliper 20 is arranged in this cutout portion and fixed to the knuckle bracket 42 with bolts 23*a* and 23*b*.

Due to the arrangement of the caliper 20 in front of the axis 75, as seen from the front of the vehicle, the caliper 20 is hidden behind a front side of the wheel 14, thereby making it possible to prevent dirt, mud, sand, snow and other debris thrown up by the front wheels 72 from directly contacting the caliper 20 fixed inside the wheel.

Further, the caliper 20 provided inside the wheel 14 of the rear wheel 74 is arranged on the downstream side in the rotation direction 92 with respect to an uppermost point 16 of the wheel 14 and on the upstream side in the rotation direction 92 with respect to a lowermost point 15 of the wheel 14. Accordingly, the dirt, mud, sand, snow and other debris deposited inside the wheel 14 at least partially drop off due to their own weight and decrease in quantity before reaching the caliper 20. Therefore, the deposited dirt, mud, sand, snow and other debris can be removed to some extent without using the scraper 30.

Figure 7:
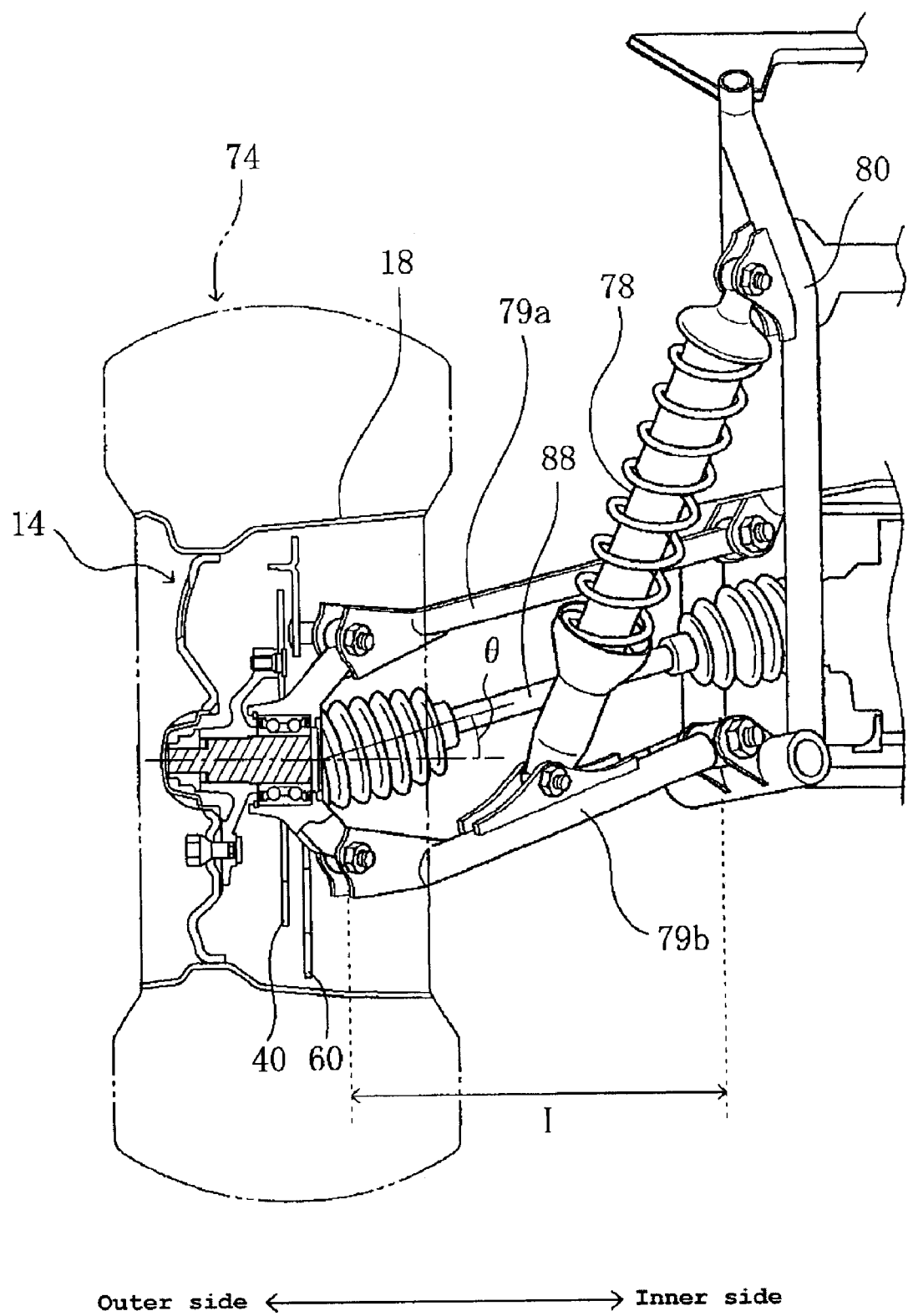
FIG. 7 is a schematic exterior view of the vicinity of the left-side rear wheel, as seen from the rear side of the vehicle.

It should be noted that in the case of the all-terrain straddle type vehicle 100 using an independent type suspension, the above-described construction in which the caliper 20 is arranged in front of the axis 75 of the rear wheel 74 proves particularly effective as a countermeasure against the wear of the brake pads inside the caliper. The reason for this will be described below with reference to FIG. 7. FIG. 7 is a schematic exterior view, as seen from the rear side of the vehicle, of the vicinity of the left-side rear wheel 74 of the all-terrain straddle type vehicle 100, and provides a see-through view of the interior of the wheel 14 for easier illustration of its internal structure.

In the all-terrain straddle type vehicle 100 using an independent type suspension, in order to improve the riding comfort by absorbing vibrations resulting from the unevenness of the road surface, the minimum ground clearance of the vehicle is high so as to provide a large stroke for the suspension 78. At this time, the smaller the pivoting angle of the suspension member (the upper arm 79*a* and the lower arm 79*b*) connecting the vehicle body frame 80 and the wheel 14, the greater the riding comfort. To this end, the dimension L of the upper arm 79*a* and the lower arm 79*b* in the vehicle width direction is long. As a result, the disc rotor 40 and the caliper 20 are arranged closer to the outside in the vehicle width direction, that is, at a position located outwardly away from the inner surface of the wheel 14. Accordingly, should dirt, mud, sand, snow and other debris enter the gap between the caliper 20 and the wheel 14, they cannot be readily discharged. Therefore, the construction in which the caliper 20 is arranged in front of the axis 75 of the rear wheel 74, as described above, proves particularly effective as a countermeasure against the wear of the brake pads inside the caliper.

Further, assuming an independent type suspension, also in the case where the drive shaft 88 for transmitting the driving force from the engine 86 to the rear wheel 74 is provided, the disc rotor 40 and the caliper 20 are arranged at positions located outwardly away from the inner surface of the wheel 14 for another reason described below. That is, the dimension L of the suspension members 79*a*, 79*b* in the vehicle width direction is long in view of the fact that the smaller the bending angle θ at the joint portion of the drive shaft 88, which occurs during the stroke of the suspension 78, the smaller the load on the joint portion.

Next, returning to FIG. 6, description will turn to the caliper 20 according to the present preferred embodiment. The caliper 20 according to this preferred embodiment includes a caliper body portion 22 that clamps the disc rotor 40, and a caliper supporting portion 24 for fixing the caliper body portion 22 within the wheel 14.

The caliper supporting portion 24 is mounted to the knuckle bracket 42 with the bolts 23*a* and 23*b*, and fixes the caliper body portion 22 within the wheel 14.

On the other hand, the caliper body portion 22 has a pair of brake pads (not shown) opposed to each other with the disc rotor 40 therebetween, and a piston 25 for pressing the brake pads against the disc rotor 40. When no braking is being applied, the gap between the brake pads and the disc rotor 40 is maintained at a constant distance.

A hydraulic pressure supply port 27 is provided on the vehicle inner side of the piston 25. The lower end of a brake hose 26 is connected to the hydraulic pressure supply port 27. The brake hose 26 extends along the upper arm 79*a* to a portion above the vehicle, and the upper end of the brake hose 26 is connected to a brake lever fitted on the handlebars 84.

When the rider grips the brake lever, the piston 25 inside the caliper 20 is pushed by the hydraulic pressure, and the piston 25 pushes out the brake pads. The brake pads and the disc rotor 40 are thus brought into contact with each other, and the friction generated by the contact between the brake pads and the disc rotor 40 brakes the rotation of the wheel 14, thereby causing the vehicle 100 to decelerate.

It should be noted that when dirt, mud, sand, snow and other debris are compressed in the gap between the caliper 20 and the wheel 14, due to interference with the caliper 20, the compressed dirt, mud, sand, snow and other debris are scattered and thrown in the form of dust, which may, upon entering the gap between the disc rotor 40 and the brake pads, accelerate wear of the brake pads to cause a reduction in the life of the brake pads. However, in this preferred embodiment, the dirt, mud, sand, snow and other debris deposited inside the wheel 14 are scraped out by the scraper 30 toward the inside of the vehicle and hence do not reach the caliper 20. Therefore, there is no fear of the dirt, mud, sand, snow and other debris being compressed in the gap between the caliper 20 and the wheel 14. It is thus possible to minimize the acceleration of wear of the brake pads to achieve an increase in the life of the brake pads.

Next, the structure of the scraper 30 inside the wheel 14 will be described. As shown in FIG. 6, the scraper 30 according to this preferred embodiment is an arcuate member arranged on the rear side within the wheel 14 so as to be opposed to the caliper 20, and is arranged along a portion of the inner periphery of the rim 18. The scraper 30 is fixed within the wheel 14 by a flexible scraper supporting member. Specifically, the scraper 30 is fixed on the rear side of the ring wheel 60 using rivets 35*a*, 35*b*. The ring wheel 60 according to this preferred embodiment is made of a resin or plastic material so that upon collision of a small stone or the like against the scraper 30, the ring wheel 60 flexes so as to mitigate the impact at the time of the collision.

An upper portion of the scraper 30 according to this preferred embodiment is bent toward the inside of the vehicle to form the scraping surface 32 directed toward the upstream side in the rotation direction 92 of the wheel 14. In the illustrated example, the scraping surface 32 is inclined so as to be directed vertically downward (but not directly below) and toward the axis 75 (the front side of the vehicle in the illustrated example).

By arranging the scraping surface 32 so as to be directed vertically downward, dirt, mud, sand, snow and other debris on the rim 18 are scraped off downward, whereby the dirt, mud, sand, snow and other debris can be readily scraped out and, in addition, it is possible to avoid a situation where the scraped dirt, mud, sand, snow and other debris are deposited on the scraping surface 32.

Further, the scraper 30 has an inclined surface 33 facing the scraping surface 32. By providing the inclined surface 33 so as to be substantially perpendicular to the scraping surface 32, the strength of the scraper 30 can be reinforced.

Further, the scraper 30 is provided not only on the inner side of the ring wheel 60 but also on the outer side of the ring wheel 60. Specifically, the scraper 30 is bent toward the outside of the vehicle in a lower portion of the scraper 30, and this bent portion projects toward the outside of the vehicle through a cutout 62 provided in a portion of the ring wheel 60, thereby forming a scraping surface 36. By thus providing the scraping surface 36 also on the outer side of the ring wheel 60, the scraper 30 can scrape out not only dirt, mud, sand, snow and other debris deposited on the inner side of the ring wheel 60 but also dirt, mud, sand, snow and other debris deposited on the outer side of the ring wheel 60.

Now, referring to FIG. 3 in addition to FIG. 6, the planar direction of the scraping surface 32 of the scraper 30 will be described. In the arrangement of the scraper 30 shown in FIG. 6, the upstream side in FIG. 3 corresponds to the lower side of the vehicle, and the downstream side corresponds to the upper side of the vehicle.

The scraping surfaces 32 and 36 of the scraper 30 are surfaces directed toward the upstream side in the rotation direction, and in the illustrated example, they are arranged so as to be directed toward the vertically lower side. The edges 34 and 38 of the scraping surfaces 32 and 36 are inclined with respect to the rotation plane 95 of the wheel 14, and extend obliquely from the lower side to the upper side of the vehicle in the direction from the outside toward the inside of the vehicle.

Since the edges 34 and 38 extend obliquely from the lower side to the upper side of the vehicle in the direction from the outside toward the inside of the vehicle, the planar direction of each of the scraping surfaces 32 and 38 is inclined so as to be directed not vertically downward (the direction of the arrow 31*a*), but toward the inside of the vehicle.

As the wheel 14 rotates, the dirt, mud, sand, snow and other debris deposited on the rim 18 are carried from the upstream side to the downstream side in the rotation direction of the wheel and move to the position of the scraper 30. Of the dirt, mud, sand, snow and other debris that have moved to the position of the scraper 30, the dirt, mud, sand, snow and other debris deposited on the inner side of the vehicle with respect to the ring wheel 60 are scraped out by the edge 34 of the scraping surface 32 and are thrown toward the inside of the vehicle. On the other hand, the dirt, mud, sand, snow and other debris deposited on the outer side of the vehicle with respect to the ring wheel 60 are scraped out by the edge 38 of the scraping surface 36, and the dirt, mud, sand, snow and other debris pass through the cutout 62 of the ring wheel 60 to be discharged toward the inside of the ring wheel 60 (see arrow 65). The dirt, mud, sand, snow and other debris discharged toward the inside of the ring wheel 60 collide against the scraping surface 32 and are thus thrown toward the inside of the vehicle.

Figure 8:
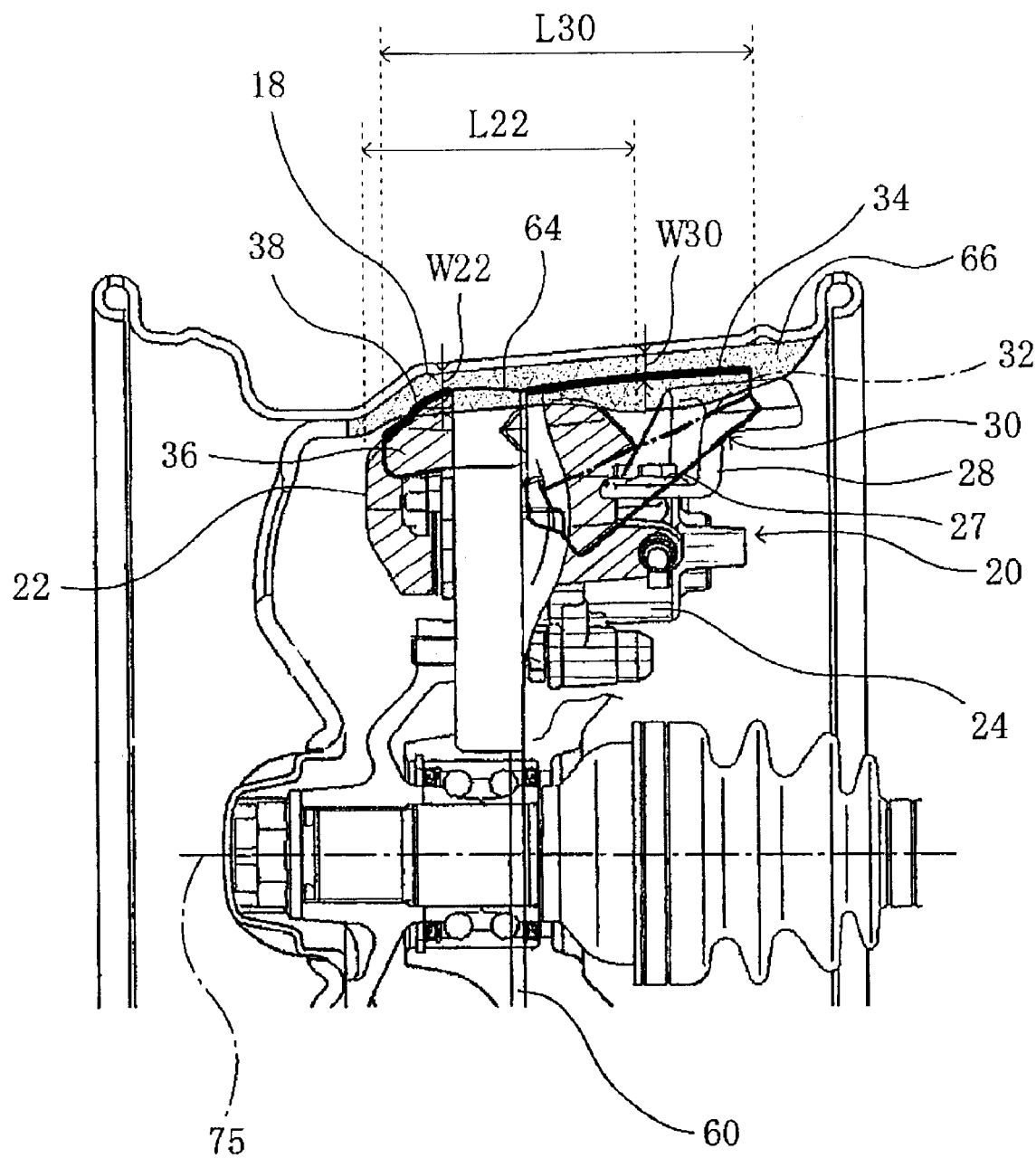
FIG. 8 is an enlarged schematic view showing a portion obtained by adding the scraper and the caliper to the schematic sectional view of FIG. 6.

Next, referring to FIGS. 6 and 8, the relationship between the mounting positions of the scraper 30 and caliper 20 within the wheel 14 will be described. FIG. 8 is an enlarged schematic view showing a portion obtained by adding the scraper 30 and the caliper 20 to the schematic sectional view of FIG. 6. For easier illustration of the positional relations of the scraper 30 and caliper 20 within the wheel, in FIG. 8, the two members are depicted in an overlapped manner.

First, referring to FIG. 6, the positional relationships of the two members within the wheel will be described with respect to the longitudinal direction of the vehicle.

The caliper 20 is arranged on the downstream side in the rotation direction 92 of the wheel 14 with respect to the lowermost point 15 of the wheel 14. On the other hand, the scraper 30 is arranged on the upstream side with respect to the caliper 20 and on the downstream side with respect to the lowermost point 15 of the wheel 14. In other words, during the rotation of the wheel 14, the scraper 30 is arranged at a position before a position where a portion of the wheel 14 that has passed the lowermost portion reaches the position of the caliper 20.

The advantage of this construction is that since the scraper 30 is arranged upstream of the caliper 20, at the time of rotation of the wheel 14, even when dirt, mud, sand, snow and other debris are deposited at the lowermost point 15 of the wheel 14, the deposited dirt, mud, sand, snow and other debris can be reliably removed by the scraper 30 before reaching the caliper 20.

It should be noted that in the case where the scraper and the caliper are integral with each other, the scraper may be located on the most upstream side within the caliper.

Further, referring to FIG. 8, the description will be made with respect to the width direction of the vehicle. As described above, the caliper 20 according to the present preferred embodiment includes the caliper body portion 22 for clamping the disc rotor 40, and the caliper supporting portion 24 for fixing the caliper body portion 22 within the wheel 14. The caliper body portion 22 projects radially outward with respect to the caliper supporting portion 24 in order to clamp the disc rotor 40. Accordingly, dirt, mud, sand, snow and other debris deposited on the rim 18 can particularly easily clog a gap W22 between the caliper body portion 22, which projects radially outward, and the rim 18 (see dirt, mud, sand, snow and other debris 64). Further, the lower end of the brake hose 26 is connected to the hydraulic pressure supply port 27 provided in the caliper supporting portion 24, and a brake hose protector 28 is arranged so as to cover the brake hose 26. Dirt, mud, sand, snow and other debris can also easily clog the gap between the brake hose protector 28 and the rim 18 (see dirt, mud, sand, snow and other debris 66).

On the other hand, in order to scrape out the dirt, mud, sand, snow and other debris deposited on the rim 18, the scraper 30 is arranged at a predetermined distance W30 from the rim 18, and has the scraping surface 32 on the inner side of the ring wheel 60 and the scraping surface 36 on the outer side of the ring wheel 60.

The all-terrain straddle type vehicle 100 is constructed such that the sum L30 of the transverse lengths of the edges 34 and 38 of the scraping surfaces 32 and 36 is longer than the transverse length L22 of the caliper body portion 22. This construction allows the scraper 30 to serve almost all the regions of the caliper body portion 22 that can be easily clogged with dirt, mud, sand, snow and other debris. Therefore, it is possible to minimize the acceleration of wear of the brake pads inside the caliper. In addition, since the edge 34 of the scraping surface 32 is extended to the position of the brake hose protector 28, it is possible to prevent not only the caliper body portion 22 but also the brake hose protector 28 from being chipped or damaged by the dirt, mud, sand, snow and other debris.

Further, the gap W30 between the edge 34 of the scraping surface 32 and the rim 18 is smaller than the gap W22 between the caliper body portion 22 and the rim 18. Specifically, while the gap W30 between the edge 34 and the rim 18 is about 6 mm, for example, the gap W22 between the caliper body portion 22 and the rim 18 is about 8 mm, for example.

Accordingly, even if the dirt, mud, sand, snow and other debris that have not been successfully removed by the scraper 30 remain on the rim 18, the remaining dirt, mud, sand, snow and other debris do not contact the caliper 20, thereby making it possible to provide an effective countermeasure against the wear of the brake pads inside the caliper. In addition, dirt, mud, sand, snow and other debris do not abut the caliper 20 unless the scraper 30 is worn by about 2 mm or more, which advantageously makes it possible to reduce the frequency of exchange of the scraper 30 due to wear.

It should be noted that in the case where the scraper and the caliper are integral with each other, the gap W22 between the caliper and the rim 18 refers to the gap between the caliper body portion 22 excluding the scraper portion and the rim 18.

While in the above-described preferred embodiments, the scraping surface 32 of the scraper 30 is preferably a flat surface, the present invention is not limited to such a construction. It suffices that the scraping surface 32 may be directed toward the inside (or the outside) of the vehicle; for example, the scraping surface 32 may be curved.

Figure 9A:
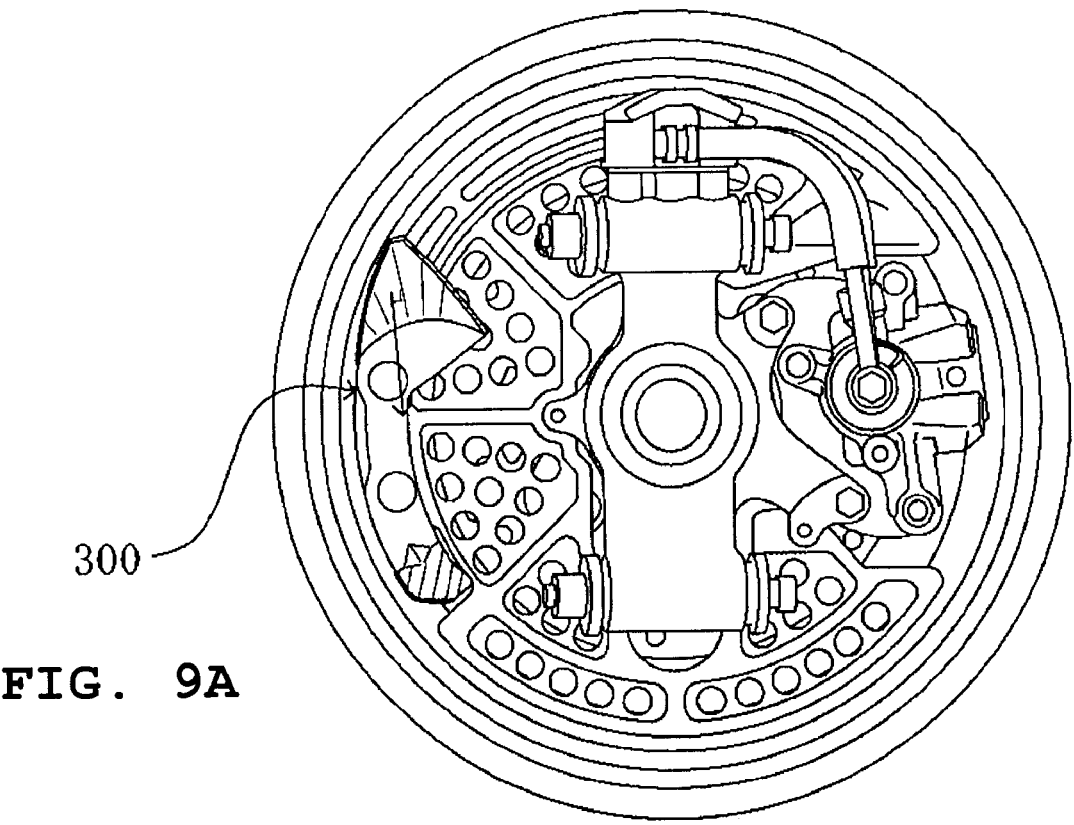
FIGS. 9A and 9B are, respectively, an exterior side view and an exterior perspective view, as seen from the inside of the vehicle, of the interior of the wheel equipped with the scraper.
Figure 9B:
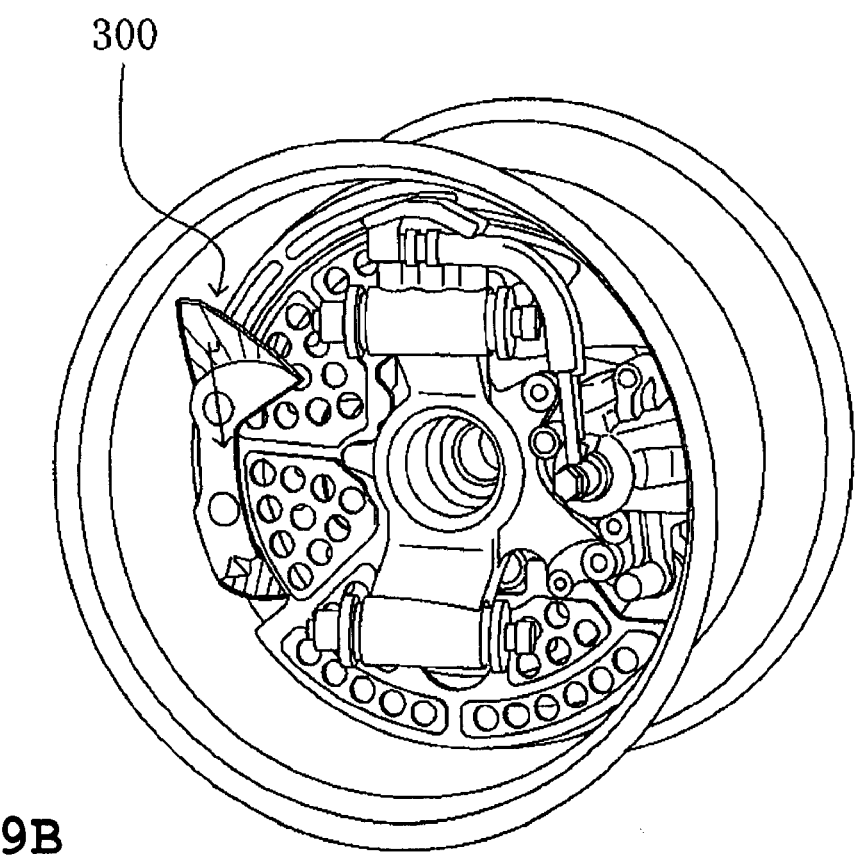

FIGS. 9A and 9B show a scraper 300 with a curved scraping surface. Since the scraped dirt, mud, sand, snow and other debris are discharged to the inside (or the outside) of the vehicle even in the case where the scraping surface is curved in this way, it is possible to minimize the acceleration of wear of the brake pads, thereby attaining the effect of increasing the efficiency of removal of dirt, mud, sand, snow and other debris.

Figure 10A:
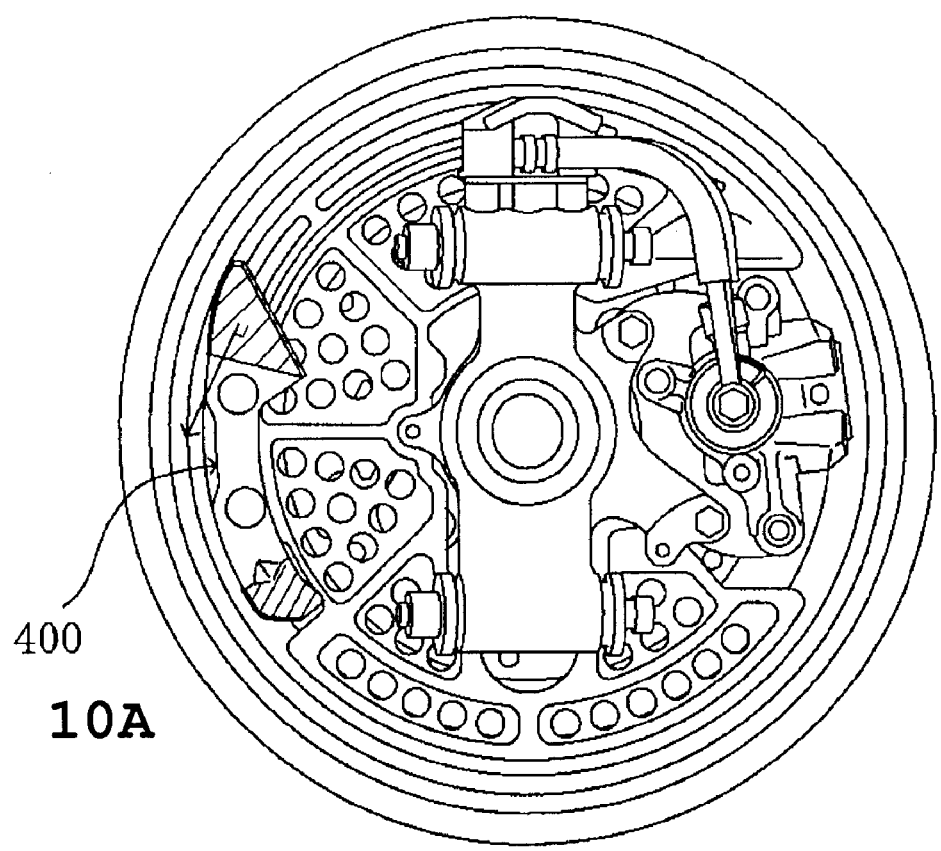
FIGS. 10A and 10B are, respectively, an exterior side view and an exterior perspective view, as seen from the inside of the vehicle, of the interior of the wheel equipped with the scraper.
Figure 10B:
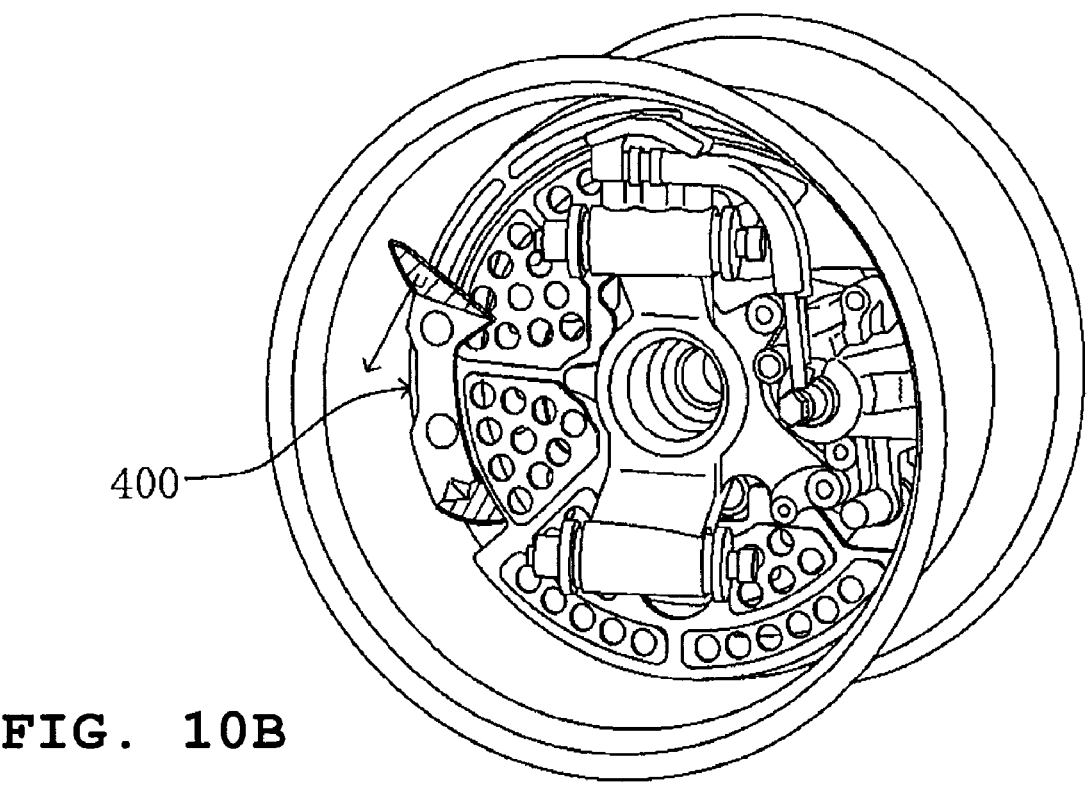

Further, while the scraper 30 according to a preferred embodiment is constructed such that the upper portion of the scraper 30 is bent so that the scraping surface 32 is directed toward the axle (toward the front of the vehicle in the illustrated example), the present invention is not limited to such a construction. For example, as shown in FIGS. 10A and 10B, the bend of the scraper 400 may be arranged radially with respect to the axle. In the case where the bend is thus arranged radially with respect to the axle, the scraped dirt, mud, sand, snow and other debris are discharged toward the inside (or the outside) of the vehicle, whereby it is possible to minimize the acceleration of wear of the brake pads and attain the effect of increasing the efficiency of removal of dirt, mud, sand, snow and other debris.

While in the above-described preferred embodiments, the description is directed to the scraper 30 preferably arranged within the wheels 14 of the rear wheels 74, the present invention can of course be applied also to a scraper arranged within the wheels 12 of the front wheels 72.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all-terrain straddle type vehicle comprising:
    a wheel including a rim; and
    a disc brake arranged within the wheel, the disc brake including:
        a disc rotor that rotates in accordance with a rotation of the wheel;
        a caliper arranged to clamp the disc rotor so as to brake the rotation of the wheel;
        a scraper arranged within the wheel to scrape out debris deposited on the rim of the wheel; and
        an edge of a scraping surface of the scraper extends obliquely from an upstream side toward a downstream side of a forward rotation direction of the wheel with respect to a rotation plane of the wheel; wherein
    the caliper includes:
        a caliper body portion arranged to clamp the disc rotor; and
        a caliper supporting portion arranged to fix the caliper body portion within the wheel; wherein
    a transverse length from an innermost side to an outermost side of the caliper body portion in a width direction of the vehicle is smaller than a transverse length from an innermost side to an outermost side of the scraping surface in the width direction of the vehicle.

2. The all-terrain straddle type vehicle according to claim 1, wherein the edge of the scraping surface extends obliquely from an outside toward an inside of the vehicle.

3. The all-terrain straddle type vehicle according to claim 1, wherein the scraper and the caliper are integral.

4. The all-terrain straddle type vehicle according to claim 1, wherein a gap between the edge of the scraping surface and the rim is smaller than a gap between the caliper and the rim.

5. The all-terrain straddle type vehicle according to claim 1, wherein:
    the caliper is arranged on the upstream side of the forward rotation direction of the wheel with respect to a lowermost point of the wheel, and on the downstream side of the forward rotation direction of the wheel with respect to an uppermost point of the wheel; and
    the scraper is arranged on the upstream side of the forward rotation direction with respect to the caliper and on the downstream side of the forward rotation direction with respect to the lowermost point.

6. The all-terrain straddle type vehicle according to claim 5, wherein the scraping surface of the scraper is directed toward a vertically lower side of the wheel.

7. The all-terrain straddle type vehicle according to claim 5, wherein the scraper and the caliper are separate components, and are arranged at positions substantially opposed to each other with a rotation axis of the wheel therebetween.

8. The all-terrain straddle type vehicle according to claim 1, wherein the wheel is a rear wheel, and the caliper provided within the rear wheel is arranged in front of an axle of the rear wheel.

9. The all-terrain straddle type vehicle according to claim 1, wherein the wheel is a rear wheel, and the caliper provided within the rear wheel is arranged on the upstream side of the forward rotation direction with respect to a lowermost point of the rear wheel and on the downstream side of the forward rotation direction with respect to an uppermost point of the rear wheel.

10. The all-terrain straddle type vehicle according to claim 1, further comprising a scraper supporting member arranged to mount the scraper within the wheel, the scraper supporting member being made of a flexible material.

11. The all-terrain straddle type vehicle according to claim 10, wherein the scraper supporting member is a ring wheel arranged to protect the disc rotor, and the ring wheel is made of a resin or plastic material.

12. An all-terrain straddle type vehicle comprising:
a wheel including a rim; and
a disc brake arranged within the wheel, the disc brake including:
    a disc rotor that rotates in accordance with rotation of the wheel; and
    a caliper arranged to clamp the disc rotor to brake the rotation of the wheel;
    a scraper arranged within the wheel to scrape out debris deposited on the rim of the wheel; and
    a scraping surface of the scraper is arranged so as to scrape out the debris deposited on the rim toward an inside of the vehicle in a width direction of the vehicle; wherein
the caliper includes:
    a caliper body portion arranged to clamp the disc rotor; and
    a caliper supporting portion arranged to fix the caliper body portion within the wheel; wherein
a transverse length from an innermost side to an outermost side of the caliper body portion in the width direction of the vehicle is smaller than a transverse length from an innermost side to an outermost side of the scraping surface in the width direction of the vehicle.

13. The all-terrain straddle type vehicle according to claim 1, wherein the edge of the scraping surface extends from an inner, supported edge of the scraper to an outer, unsupported edge of the scraper obliquely from the upstream side toward the downstream side in the forward rotation direction of the wheel.

* * * * *